Dec. 25, 1928.　　　　　　　　　　　　　　　1,696,393
E. D. FAGEROS
MOTOR GAUGE
Filed May 28, 1927
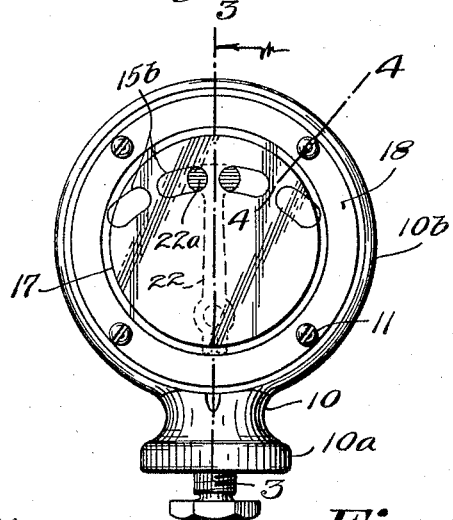
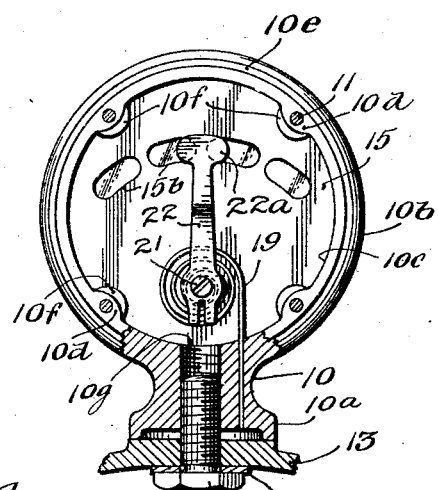
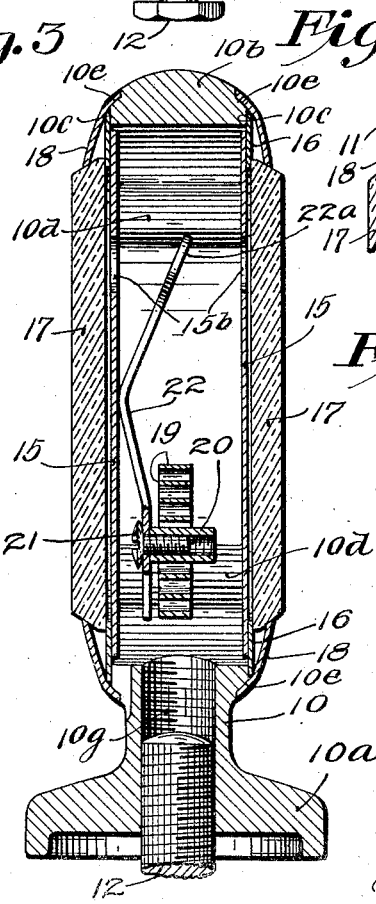
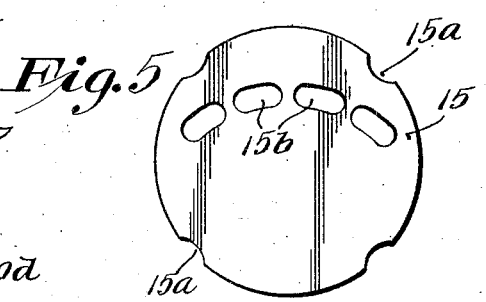
Inventor
Edgar D. Fageros
By his Attorneys Patented Dec. 25, 1928.

1,696,393

UNITED STATES PATENT OFFICE.

EDGAR D. FAGEROS, OF MINNEAPOLIS, MINNESOTA.

MOTOR GAUGE.

Application filed May 28, 1927. Serial No. 194,950.

This invention relates to a motor gauge for indicating the temperature of an internal combustion engine, and while the gauge may be used in various ways, and on various engines, it particularly is designed for use on automobiles. While the invention may be mounted at different places on the automobile, in practice it has been found very satisfactory to mount the gauge on the radiator cap of the hood. It may be stated that devices have heretofore been proposed for indicating abnormal temperatures in the cooling system of an automobile engine, but it has been the theory that these devices should indicate the temperature of an enclosed space above the water level in the cooling system or radiator of the automobile. Applicant has discovered, however, that a very effective indication may be secured simply indicating the temperature of the metal adjacent the engine. When the engine becomes heated the metal of the same is, of course, heated and this heat is transferred to the metal of the radiator shell or hood. The shell becomes heated irrespective of the temperature of the cooling fluid and in direct proportion to the heat of the engine.

It is an object of this invention, therefore, to provide a motor gauge including a temperature responsive element which is disposed in or connected to the metallic body of the gauge and which does not extend into the space enclosed, or otherwise, above the water level of the cooling system or into the interior of the radiator or hood.

It is also an object of the invention to provide an indicator for indicating the temperature of the automobile engine, which indicator has a body portion of metal forming a good conductor of heat and also has a thermostat member disposed in the body of the indicator, together with means for securing said indicator to the metal adjacent the engine.

It is still another object of the invention to provide such a gauge or indicator, as set forth in the previous paragraph, which is disposed on the automobile so as to be visible to the driver of the automobile.

These and other objects and advantages of the invention will be fully set forth in the following description made in connection with the accompanying drawings in which like reference characters refer to the same parts throughout the different views, and in which, Fig. 1 is a view in front elevation of the device showing the side disposed toward the driver;

Fig. 2 is a view partly in front elevation with certain parts removed and partly in vertical section;

Fig. 3 is a view in vertical section taken substantially on the line 3—3 of Fig. 1;

Fig. 4 is a partial radial section of the device taken on the line 4—4 of Fig. 1, Figs. 3 and 4 being shown on an enlarged scale; and Fig. 5 is a face view of a plate used on the device.

Referring to the drawings, a motor gauge, or indicating instrument, is shown having a body portion 10. This body portion is made of metal which is a good conductor of heat, such as aluminum. The body portion has a circular or cylindrical base part $10^a$ with a neck or standard rising therefrom of reduced cross section, from which extends a cylindrical casing $10^b$ having its outer surface of convex formation, said portion $10^b$ being open at each side. The portion $10^b$ has an annular ledge $10^c$ at each side, and a plurality of circumferentially spaced bosses $10^d$ extending inwardly from this ledge which are tapped to receive screws 11 to be later described. Outward of the ledge $10^c$ the portion $10^b$ has an annular recess $10^e$ at each side thereof, the bottom of which is curved substantially parallel to the exterior of said portion $10^b$. The inner side of the lugs $10^d$ are provided with flat surfaces $10^f$ parallel to the surface $10^c$ and somewhat below the same. The base portion $10^a$ of the body and the portion immediately above the same are bored and tapped as shown at $10^g$, to receive a headed attaching bolt 12 threaded into said bore, the head of said bolt being disposed at the inner side of the metal 13 of the hood or radiator cap or of the metallic part to which the indicator is attached, the base $10^a$ being disposed on top of the member 13 at the outer side thereof, an insulating washer 14 preferably being disposed between the head of bolt 12 and member 13.

A pair of plates 15, such as shown in Fig. 5, are provided, which may be of thin sheet material, preferably metal, and these plates are disposed at either side of the portion $10^b$ of the indicator body and rest on the surfaces $10^f$, said plates being equipped with recesses $15^a$ adapted to surround the upper portions of the lugs 10ᵈ. Outside of the plates 15 are disposed thin annular members 16 fitting in the annular recess 10ᶜ. The members 16 may be made of thin fiber or other suitable material. Lenses 17 are disposed on the members 16 and are of cylindrical or conical form having beveled sides. The lenses 17 are held in place by annular curved plates 18 disposed at each side of the body portion 10ᵇ and fitting within the recesses 10ᵉ, as shown in Fig. 3, the members 18 and 16 being clamped, or secured in position by the screws 11 threaded into the lugs 10ᵈ. The plates 15 have a series of elongated openings, or slots 15ᵇ therein arranged on the arc of a circle, as clearly shown in Figs. 1, 2 and 5.

A thermostat member 19 is provided consisting of a strip of thin thermostatic metal and one end of this strip is disposed in or embedded in the lower portion of casing 10, as shown in Fig. 2. The upper portion of member 19 is formed in a spiral coil, the inner end of which is secured to a small threaded shell 20 to which is clamped by the headed screw 21 an indicator arm 22. The hand 22 consists of a thin strip of metal and the same has at its upper end an enlarged head portion 22ᵃ. The head portion 22ᵃ is adapted to move in the rotation of arm 22 in alinement with the openings 15ᵇ, the openings 15ᵇ being arranged with their center lines on an arc concentric with the center of screw 21. In practice, the head 22ᵃ preferably will be made of some bright color, such as red.

In operation, the gauge is mounted on the radiator cap or some other metallic portion adjacent the engine to which heat is transferred by the engine, the same being secured, as shown and described. When the engine becomes heated, this heat is transferred through the metal 13 to the body portion 10. The body portion 10 being of metal which is a good conductor of heat, transfers the heat to the member 19. As this member is heated the coil thereof expands and the hand 22 is rotated to the right, as shown in Figs. 1 and 2. When the engine is perfectly cool, the hand 22 will be in its extreme left hand position. When the engine is at normal running temperature the hand will be substantially in the position shown in Figs. 1 and 2. After the engine becomes abnormally heated, the hand will move to the right and when dangerous temperatures are reached, will be in alinement with the opening 15ᵇ at the right, as shown in Figs. 1 and 2. It will be understood that there is a light opening entirely through the device through the slots 15ᵇ in each of the plates 15. When the head 22ᵃ comes into alinement with any of the slots 15ᵇ, this light opening is closed and the position of the hand 22 can readily be seen by the driver. The hand 22 is bent at an angle to engage lightly with one of the plates 15 to prevent undue vibration thereof.

From the above description it is seen that applicant has provided a simple and efficient motor gauge and one which will effectively indicate the temperature of the automobile engine from the metal thereof. There are no temperature indicating elements disposed in the hood of the automobile or in any enclosed space, nor is the temperature indicating element responsive to the temperature in any enclosed space or of the water in the cooling system, but the same is responsive to the temperature of the metal adjacent the engine which is heated by the engine. The temperature indicating element is disposed entirely without the radiator or hood or the standard parts of the automobile. The parts of the device are quite few and simple in construction, and the same has been demonstrated in actual practice.

It will, of course, be understood, that various changes may be made in the form, details, arrangement and proportions of the parts without departing from the scope of applicant's invention, which, generally stated, consists in a device capable of carrying out the objects set forth, in the novel parts and combinations of parts shown and described and defined in the appended claims.

What is claimed is:

1. A motor gauge having in combination, spaced oppositely disposed disks, an oscillating indicator hand pivoted to swing between said disks and parallel therewith, said disks having adjacent their upper edges a series of oblong openings having their longitudinal center lines arranged on a line substantially concentric with the pivot of said hand, said hand having a portion movable into alinement with said openings, said hand having a portion moving in engagement with one of said disks to prevent undue vibration of said hand.

2. A device for indicating the temperature of an automobile engine having in combination with the metal adjacent said engine, an indicating means having a metal body mounted on said metal including a temperature responsive element embedded in said metal body, and means controlled by said element for giving a temperature change indication visible to the driver of said automobile.

3. A device for indicating the temperature of an automobile engine having in combination, a body having substantially flat opaque sides with a chamber therebetween and having spaced sight openings therethrough, a thermostat member having a shank portion secured in the material of said body and a coil portion connected to said shank portion and disposed within the chamber of said body, and a hand connected to said coil having a head portion adapted to move in alinement with said sight openings.

4. A motor gauge having in combination, a member having an annular rim, disks secured at each side of said rim forming therewith a casing, said disks having adjacent their upper edges a series of oblong openings having their longitudinal center lines arranged on a line substantially on the arc of a circle, a thermostat coil in said casing having its center substantially at the center of said circle and having a portion secured to said casing, and a hand secured at the center of said coil having a portion movable in alinement with said openings.

5. A device for indicating the temperature of an automobile engine having in combination, an indicating means having a metal body having a base portion and a hollow casing portion thereabove, a thermostat member having a vertical shank portion embedded in said base portion, and a vertically disposed spiral coil connected in substantially tangential relation to said shank, and an indicating hand connected to said coil.

In testimony whereof I affix my signature.

EDGAR D. FAGEROS.